Figure 1:
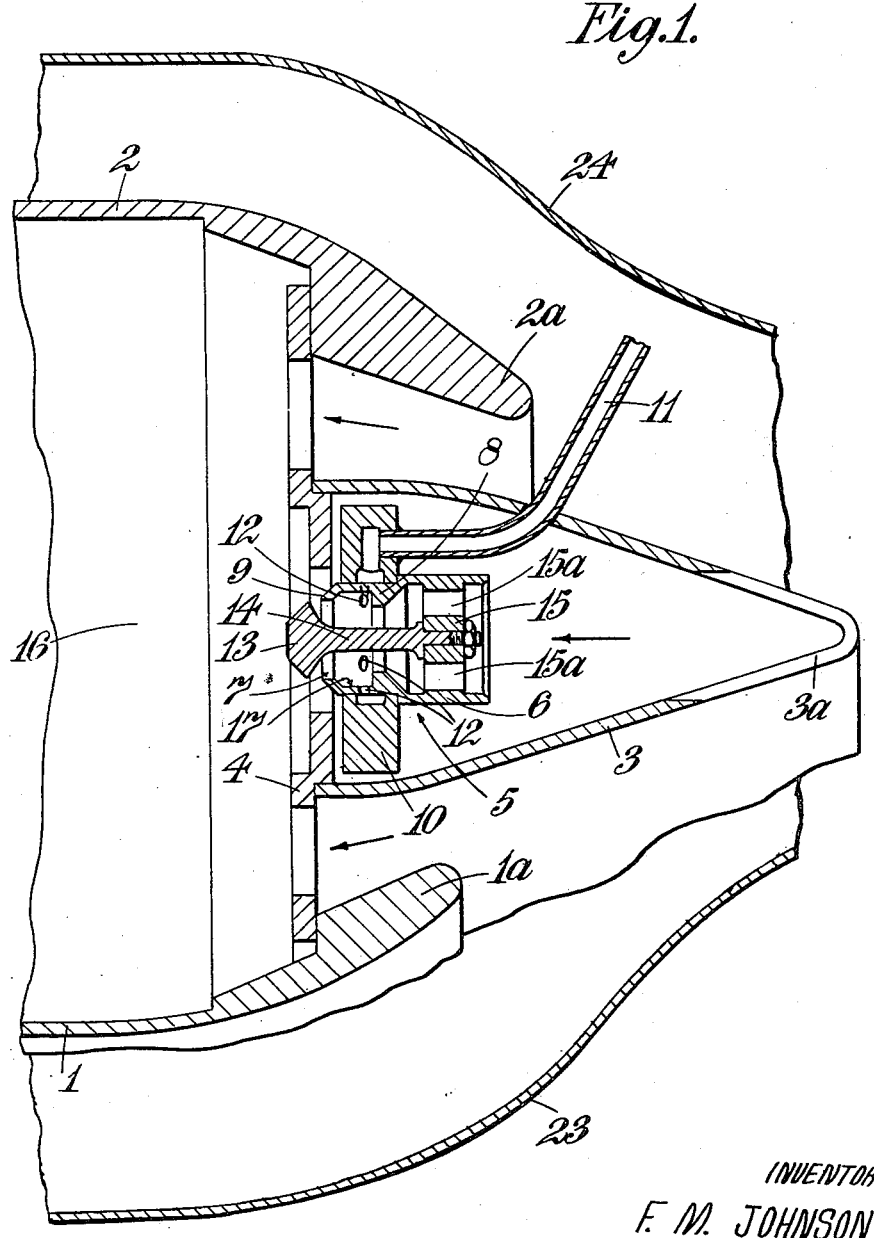

Nov. 27, 1956    F. M. JOHNSON ET AL    2,771,744
FUEL INJECTION MEANS OF COMBUSTION EQUIPMENT
FOR GAS TURBINE ENGINES
Filed April 27, 1953    5 Sheets-Sheet 2

INVENTORS
F. M. JOHNSON &
D. R. CARLISLE
BY Wilkinson & Mawhinney
ATTYS.

INVENTORS
F. M. JOHNSON &
D. R. CARLISLE
BY Wilkinson & Mawhinney
ATTYS.

Nov. 27, 1956 F. M. JOHNSON ET AL 2,771,744
FUEL INJECTION MEANS OF COMBUSTION EQUIPMENT
FOR GAS TURBINE ENGINES
Filed April 27, 1953 5 Sheets-Sheet 4
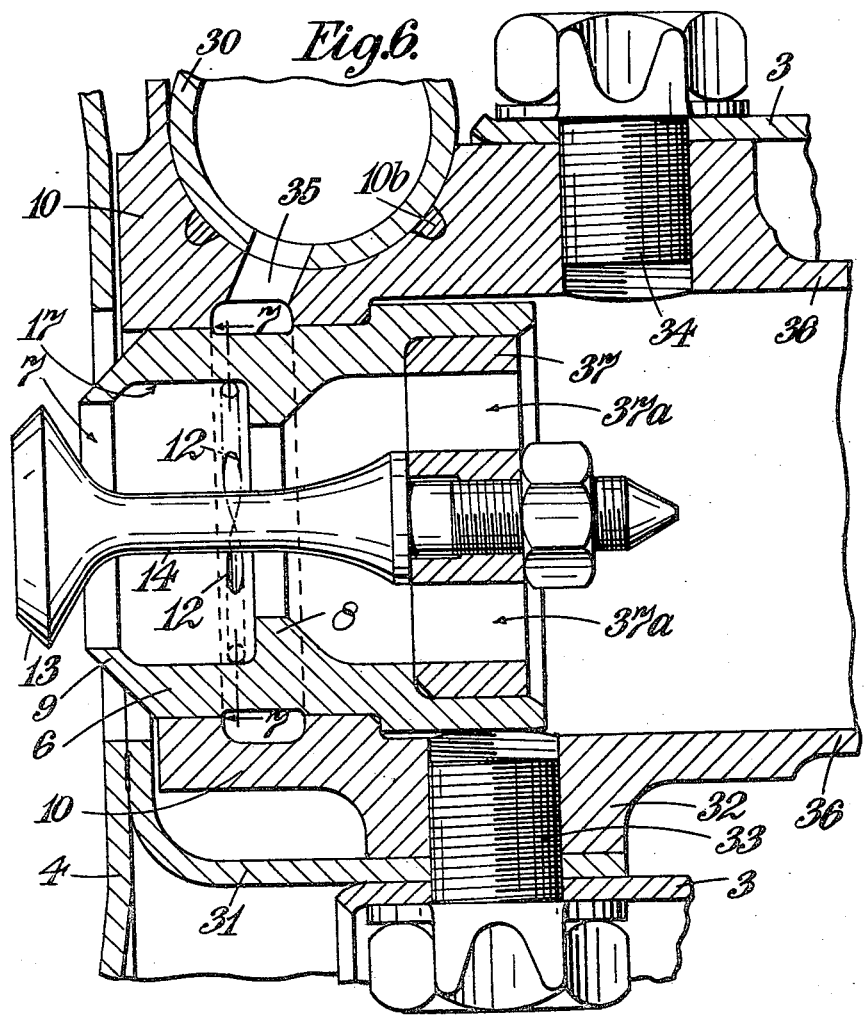
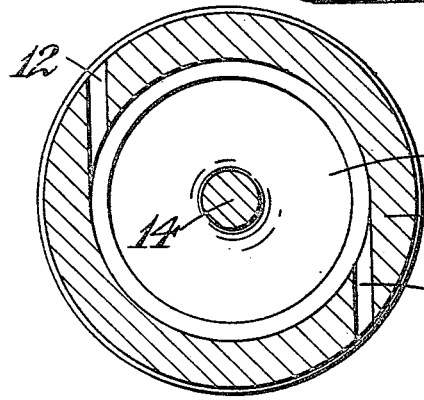
INVENTORS
F. M. JOHNSON &
D. R. CARLISLE
BY
Wilkinson & Mawhinney
ATTYS.

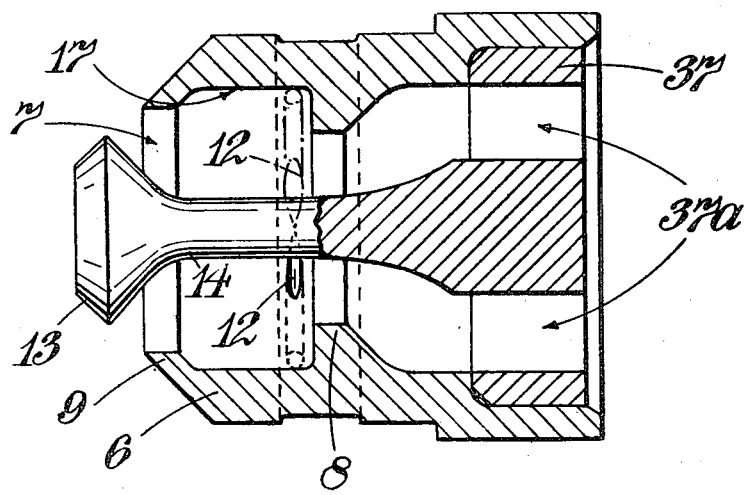

United States Patent Office 2,771,744
Patented Nov. 27, 1956

2,771,744

FUEL INJECTION MEANS OF COMBUSTION EQUIPMENT FOR GAS TURBINE ENGINES

Francis Murray Johnson, Streatham, and Denis Richard Carlisle, Risley, England, assignors to Rolls-Royce Limited, Derby, England, a British company Application April 27, 1953, Serial No. 351,112

Claims priority, application Great Britain May 7, 1952

6 Claims. (Cl. 60—39.74)

This invention relates to internal combustion engines and is more specifically concerned with combustion equipment of gas turbine engines.

Gas-turbine engine combustion equipment is usually constructed to be of one of three types. The first type comprises substantially a plurality of separate combustion chambers which receive combustion air from an engine compressor and deliver the products of combustion to an engine turbine, each of which combustion chambers may comprise an air casing with a coaxial tubular flame tube within it. The second type combustion equipment is of annular form and comprises coaxial inner and outer air casing walls and within the annular space between the air casing walls a plurality of tubular flame tubes within which combustion occurs. The third type of combustion equipment comprises essentially coaxial inner and outer air casing walls and within the annular space between the air casing walls an annular flame tube having inner and outer walls which are coaxial with the air casing walls.

The present invention may be employed in combustion equipment of any of the three types just described.

This invention has for an object to provide a simplified construction of fuel injection means having good fuel atomisation characteristics.

According to the present invention, fuel injection means for gas-turbine engine combustion equipment comprises an injector body for mounting in a combustion chamber and having a passage extending therethrough to permit part of the combustion air entering the combustion chamber to pass without substantial deviation through the passage, and means adjacent the outlet end of the passage to produce on a surface having a spill lip at its downstream extremity a layer of fuel in contact with the air flowing through the passage whereby the air flow through the passage assists in the atomisation of the fuel flowing over the lip.

According to one arrangement of the present invention, the fuel injection means may comprise an injector body arranged to produce on a surface therein a swirling annular sheet of fuel which provides a boundary for part of a passage extending through the injector body from an inlet to an outlet, the fuel of said fuel annulus being arranged to spill from the surface over a boundary lip at said outlet to produce a conical sheet spray, and may also comprise means adjacent the outlet end of the passage through the injector body to deflect the air leaving the passage to produce a conical air blast to assist in the atomisation of the fuel.

In one preferred embodiment of this arrangement, the fuel injection means comprises an open-ended tubular body arranged to be supported within the combustion chamber so that part of the air entering the duct afforded by the chamber passes without substantial deviation through the tubular body from one open end thereof to the other open end, an inwardly-facing channel in the inner surface of the tubular body to encircle the passage through the body, one end wall of the channel being formed as an inwardly-extending lip defining the downstream open end of the tubular body, tangentially-arranged fuel inlets opening through said inner surface into he channel whereby a swirling layer of fuel can be formed .a said channel to spill over said lip to produce a conical sheet spray, and a substantially conical baffle member supported substantially coaxially within the lip to deflect the air flowing through the downstream open end of the tubular body into a conical path thereby to assist in the atomisation of the fuel spray.

The tubular body may have formed in its wall an annular fuel gallery encircling the inwardly-facing channel and communicating therewith through orifices leading tangentially into the base of the channel, the fuel gallery being connected to be fed with fuel from a fuel supply pipe, which may be a manifold having a plurality of fuel injectors connected to it at circumferentially-spaced locations.

The conical baffle may be formed with an axial stem extending through the tubular body and mounted in a perforated wall at the inlet end of the tubular body.

According to another arrangement of the present invention, which arrangement is especially suitable for fully annular combustion chambers, the injector body of the fuel injection means may have a passage extending therethrough from an inlet to an outlet, and at the outlet a part affording at least one surface shaped to deflect air flowing from the outlet and terminating at its downstream edge in a lip, and fuel supply means to deliver a sheet of fuel along the surface towards the lip, whereby the air flowing through the outlet assists to atomise the fuel flowing over the lip. The injection means may be arranged to provide one or more continuous sprays of fuel around the whole annular combustion chamber, or may provide a series of flat or curved sprays which together provide substantially at least one continuous spray around the annular combustion chamber.

In one embodiment according to this arrangement the surface-affording part is a bar or block having downstream portions of a pair of opposite surfaces diverging to afford two curved surfaces each terminating in a sharp edge affording a spill lip, and fuel injection orifices are formed in the bar to direct fuel along the surfaces towards the lips. The bar is arranged between two outlets from the injector body so that the curved surfaces are just downstream of the orifices and the walls of the orifices are arranged to converge to give a fan-like accelerating air stream which increases in width in the direction of air flow but decreases in depth at right angles to the surface.

The invention comprises in another aspect, the combination with a combustion chamber for a gas-turbine engine, which combustion chamber affords a duct through which combustion air flows from an air inlet to a combustion product outlet, of fuel injection means as just set forth arranged within the duct adjacent the air inlet so that air entering the chamber can pass without substantial deviation through the passage in the injector body.

The arrangements of this invention have the advantages that effective atomization of the fuel is obtained with low fuel pressures, that the device is simple to manufacture since the orifice forming the outlet end of the tubular body can be larger than the fuel outlet orifices of conventional atomizing fuel injectors, and that the air for assisting atomization of the fuel is part of the air normally flowing in the combustion chamber and not a specially ducted air supply as is usual with known constructions of atomizing fuel injectors.

Figure 2:
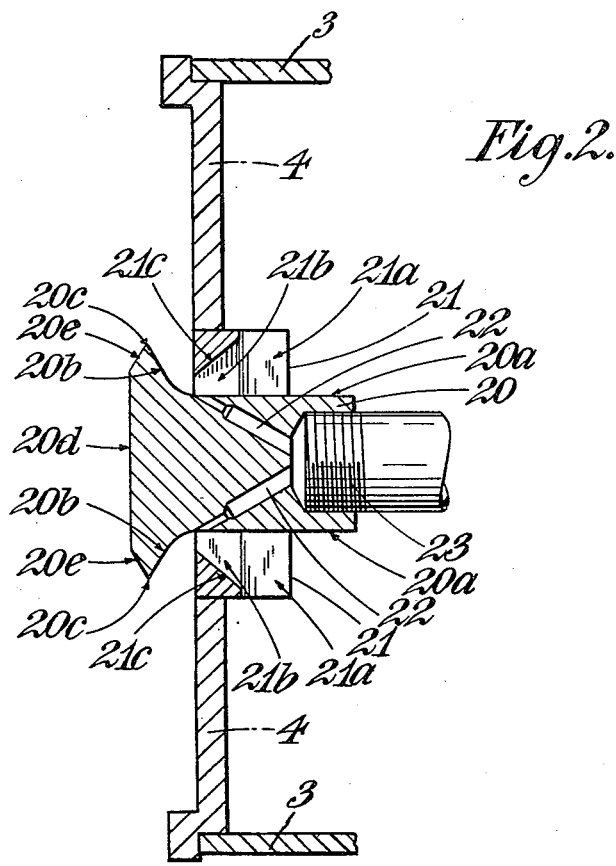
Figure 3:
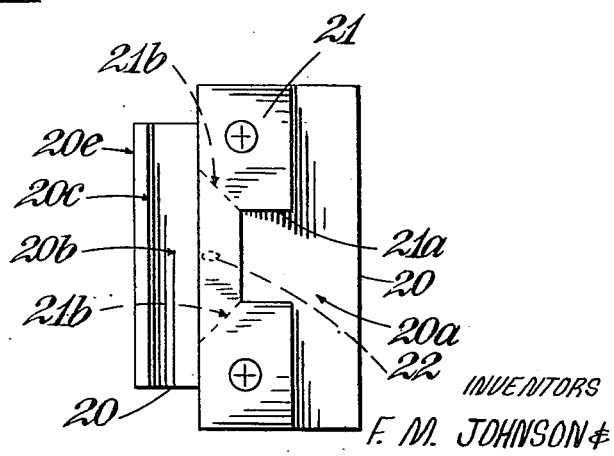
Figure 4:
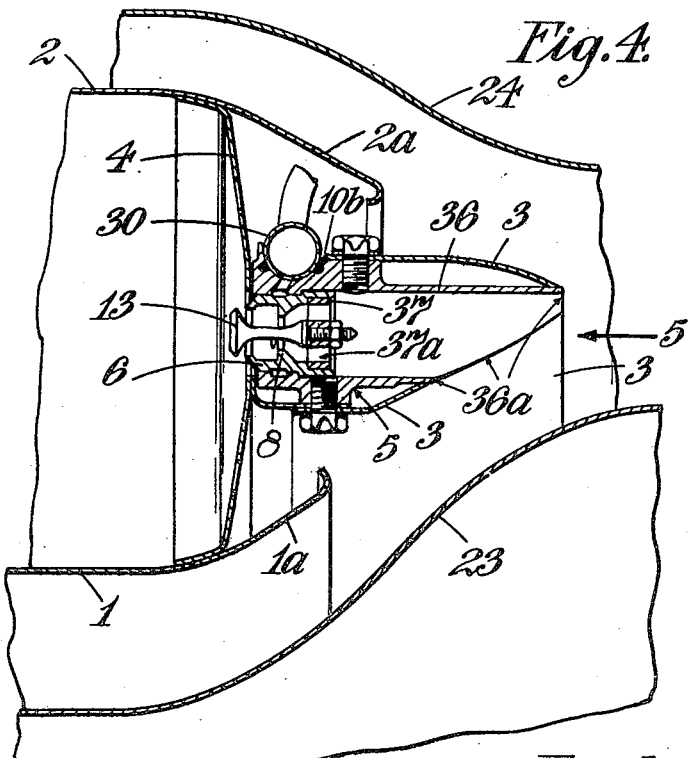
Figure 5:
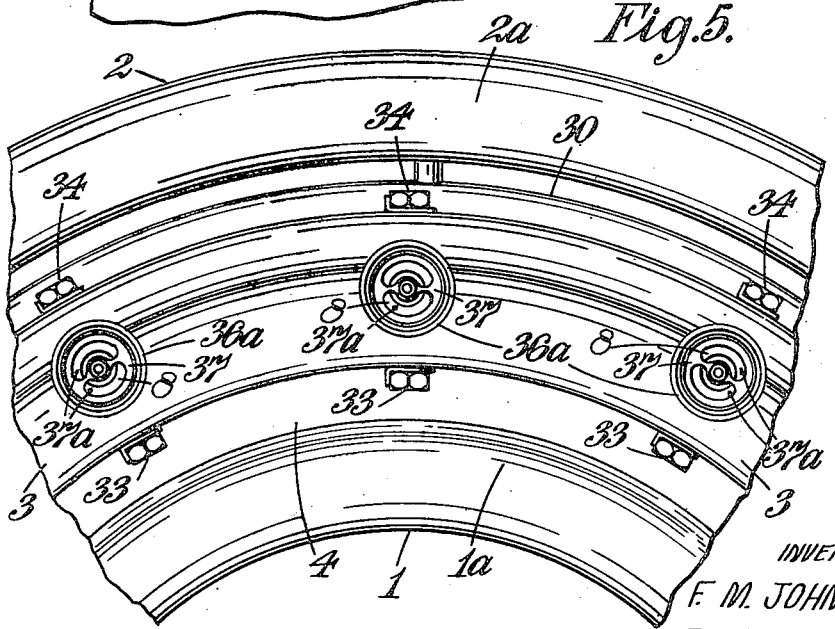

Some embodiments of this invention will now be described by way of example as applied to injecting fuel into annular combustion equipment. The description makes reference to the accompanying drawings in which:

Figure 1 is an axial section through one embodiment drawn to an enlarged scale,

Figures 2 and 3 illustate a second embodiment drawn to an enlarged scale of means for injecting fuel into combustion equipment, Figure 2 being a radial section through the injection means and Figure 3 being a plan view, Figure 4 is a radial section through a third embodiment, Figure 5 is a view in the direction of arrow 5 of Figure 4, Figure 6 is an enlarged view of part of Figure 4, Figure 7 is a section on the line 7—7 of Figure 6, and Figure 8 is a view corresponding to Figure 6 showing a modification of part of the arrangement of Figure 6.

Referring to Figure 1, the annular combustion equipment comprises an air casing having coaxial inner and outer walls 23, 24 and within the annular space between the walls 23, 24 inner and outer annular walls 1 and 2 of a flame tube. The walls 1 and 2 are spaced away from the adjacent air casing walls 23, 24 and combustion occurs in the space 16 between the flame tube walls.

The upstream edges of the flame tube walls 1 and 2 have inturned lips 1a, 2a to define between them the air entry to the combustion space 16 afforded between the walls 1 and 2 and there is supported centrally between the inturned lips 1a, 2a a divergent fairing 3 which divides the air passing between the inturned lips into two main flows. The fairing 3 is supported from the walls 1 and 2 by a perforated annular plate 4.

The annular plate 4 also provides the support for fuel injection means which are arranged roughly midway between the inner and outer flame tube walls 1 and 2.

The fuel injection means comprises a ring of injectors 5 and the leading edge of the fairings 3 is cut away as indicated at 3a in line with each of the injectors 5.

Each injector 5 comprises a substantially tubular body 6 affording a passage by which air entering the combustion equipment and flowing towards the fairing 3 can pass directly through the cut-away 3a and the passage within the tubular body 6 to an outlet 7 opening directly into the combustion space 16 afforded between the walls 1 and 2.

The internal surface of the tubular body 6 is formed with a pair of radially-inwardly-projecting flanges 8 and 9 which flanges are spaced apart axially of the tubular body 6 and which afford between them an annular fuel-receiving channel 17 which encircles the part of the passage through the tubular body 6 which is adjacent the outlet 7. The flange 9 constitutes a lip over which fuel in the channel 17 can spill into the combustion space 16 and also defines the outlet 7 from the passage. The flange 8 thus projects inward somewhat further than flange 9.

Each injector 5 also comprises an annular channelled member 10 encircling the body 6 and affording within it a fuel gallery which is supplied with fuel through supply pipe 11 and fuel passes from the gallery into the channel 17 through a ring of transfer ports 12 which are arranged tangentially to the bottom surface of the channel 17. Thus, fuel entering the channel 17 is given a swirling motion about the air passage and the fuel spilling over the lip 9 into the combustion chamber 16 forms a conical sheet of fuel.

Each injector body 5 has associated with it a baffle member of roughly mushroom form having a conical head 13 which is disposed within the combustion space 16 between the walls 1 and 2 just downstream of and coaxial with the outlet 7, and also having a stem 14 which extends coaxially through the passage in the tubular member 6 to be secured at its upstream end to a wall 15 which is formed with a ring of holes 15a affording the air inlets to the passage through the tubular member 6. The head 13 of the baffle member acts to deflect the air flowing out from the passageway in the tubular member 6 into a conical air blast and the conical air blast assists to atomize fuel in the conical sheet spilling over the lip 9.

The outlet 7 may conveniently have a diameter of about 0.3" which is substantially greater than the fuel orifice diameter in the conventional atomizing fuel injectors, and thus the manufacture of the fuel injector means of this invention is simplified as compared with conventional atomizing fuel injectors. The manufacture is further simplified by reason that the fuel injector means of this invention comprises a smaller number of parts.

It will be appreciated that the invention may equally be applied to combustion equipment having a plurality of tubular flame tubes.

Referring now to Figures 2 and 3, there is illustrated a simple embodiment, especially suitable for fully annular combustion chambers and adapted to produce two flat sheets of fuel spray. In this case the fuel injector body comprises a bar or block 20 and two orifice-forming pieces 21, and these parts are mounted on a plate such as plate 4, in an aperture therein. The bar or block 20 is wedge-like and has its radially inner and outer surfaces formed with flat portions 20a and, at the downstream edges of the flat portions, with outwardly curved portions 20b having an included angle of about 120° at their downstream edges. The downstream edges 20c are sharp and the flat front face 20d is conveniently chamfered at about 30° at its inner and outer margins 20e.

Each orifice-forming piece 21 is secured to the bar or block 20 and is formed with a central cut-away which forms with the adjacent surface 20a the air outlet orifice. Each cut-away has side walls with parallel portions 21a and, at the downstream ends of the parallel portions, divergent portions 21b, and a top wall 21c level with the divergent side wall portions 21b, which top wall converges (Figure 2) towards the surface 20a. The divergence of wall portions 21b and the convergence of wall 21c and surface 20a are selected so that the cross-section of the orifice at right angles to the direction of flow decreases in the direction of flow and produces a fan-like accelerating air jet flowing towards the surface 20b.

A jet of fuel is sprayed onto each of the curved surfaces 20b, and this may be achieved by drillings 22 set at an included angle of 60° and leading from the fuel union 23 provided on the upstream face of the bar or block 20.

The outlet from each drilling 22 is so positioned in relation to the curved surfaces 20b that a sheet of fuel is formed on the surface, which is given additional energy by the fan-shaped stream of air. The fuel is thus atomized as it passes over the sharp edge 20c which forms the downstream boundary of the curved surface, and gives a flat sheet spray of atomized fuel.

The curved surfaces are preferably polished, and may also be curved to conform to the curvature of a combustion chamber.

Several devices as just described may be employed with each annular combustion chamber to produce a series of flat or curved sprays which together form a substantially continuous spray around the combustion chamber.

Referring now to Figures 4 to 7, there is illustrated in detail an arrangement similar to that illustrated in Figure 1 and the same reference numerals are used in these Figures to denote the same parts.

In this construction the flame tube parts are all formed from sheet metal and a plurality of injectors 5 are fed from a manifold 30 located upstream of the perforated wall 4. The injectors 5 are conveniently mounted on the manifold 30 and the manifold communicates with the fuel gallery in each injector 5 by port 35. A groove 10a may be formed in the surface of channelled member 10 to receive a copper ring 10b, by means of which the manifold 30 may be brazed to the member 10.

The fairing 3 is formed from sheet metal and is secured to the wall 4 through a flanged piece 31 welded to the wall radially inwards of the injectors 5, the flanged piece 31 being gripped between an edge of the fairing 3 and a land 32 on the channelled member 10 by means of bolts 33. The outer wall of the fairing 3 is secured by bolts 34 to the outer surface of the channelled member 10.

The stem 14 of each injector 5 is secured to an insert 37 which fits in the upstream end of the body 6 and insert 37 is formed with kidney shaped ports 37a to permit the passage of air therethrough. The head 13 has a diameter almost equal to that of the outlet formed by the flange 9.

The channelled member 10 of each injector has a cylindrical skirt 36 extending upstream from it and the upstream edge 36a of the skirt 36 lies in the surface of the fairing 3 and thus appears circular as viewed in the direction of arrow 5.

In an alternative arrangement (Figure 8) the stem 14 of the baffle member is formed in one piece with its supporting insert member 37, the head 13 of the baffle member being of a diameter just smaller than the outlet 7 to be passed therethrough. The insert 37 may be pressed or shrunk into the body 6.

With each of the arrangements above described it will be seen that a substantial part of the air entering the combustion space afforded between the flame tube walls 1 and 2 passes directly into it through the fuel injectors 5 without substantial deviation.

The fuel injector means of this invention is capable of operating to give efficient atomization even at low fuel pressures.

The fuel injector means of this invention is further simplified as compared with conventional atomizing fuel injectors, in that the air employed to assist in atomization of the fuel is normal combustion air entering the combustion chamber and flowing to the combustion space without substantial deviation, whereas in conventional fuel injectors in which atomization is assisted by an air supply, the air is conveyed to the injector from a source outside the combustion chamber through piping.

We claim:

1. In or for combustion equipment of a gas turbine engine comprising an air casing including at least one wall adapted to define a duct through which substantially the whole of the air for combustion passes into the combustion equipment, a flame tube having at least one wall adapted to define a combustion space internally of said flame tube, said flame tube including air entry means adapted to admit air from externally of said flame tube to said combustion space, fuel injection means comprising an injector body mounted adjacent a wall of said flame tube, said injector body defining a passage therethrough having an inlet end and an outlet end, said passage opening at its outlet end to said combustion space and at its inlet end to said duct, a baffle member extending through the outlet of said passage and extending within said passage in spaced relation to the injector body, said baffle member having an outwardly-extending portion at its downstream end which portion extends substantially across the axial projection of the passage downstream of the outlet of said passage, whereby air flowing into the combustion space through said passage is diverted outwardly adjacent the outlet of said passage, means defining a fuel-receiving surface adjacent the outlet of said passage, part at least of said surface forming a boundary of said passage, means defining a projecting lip at the downstream end of said surface, and means to supply fuel to said fuel-receiving surface.

2. In or for combustion equipment of a gas-turbine engine comprising an air casing including at least one wall adapted to define a duct through which substantially the whole of the air for combustion passes into the combustion equipment, a flame tube having at least one wall adapted to define a combustion space internally of said flame tube, said flame tube including adjacent the upstream end thereof in the general direction of flow through the combustion equipment air entry means adapted to admit air from externally of said flame tube to said combustion space, fuel injector means comprising a tubular injector body adapted to be mounted adjacent a wall of said flame tube at the upstream end of the flame tube, said injector body defining a passage therethrough of substantially circular cross-section having an inlet end and an outlet end, said passage opening at its outlet end to said combustion space and at its inlet end to said duct, an inwardly-projecting circular lip formed on said injector body at its outlet end, an inwardly-projecting circular flange formed on said injector body intermediate its ends and of greater radial extent than said lip, said lip and said flange defining therebetween an annular fuel-receiving recessed channel, said channel forming a boundary of said passage, means including a port tangential to the circumference of said channel to supply fuel thereto, and a baffle member extending through the outlet of said passage, having a stem of substantially circular section extending concentrically within said passage in spaced relation to the injector body, and having an outwardly-extending portion of substantially conical form at its downstream end which portion extends substantially across the axial projection of the passage downstream of the outlet of the passage, whereby air flowing into the combustion space through said passage is diverted outwardly adjacent the outlet of said passage to assist atomization of fuel spilling over the lip.

3. In or for combustion equipment of a gas-turbine engine comprising an air casing including at least one wall adapted to define a duct through which substantially the whole of the air for combustion passes into the combustion equipment, a flame tube having at least one wall adapted to define a combustion space internally of said flame tube, said flame tube including air entry means adapted to admit air from externally of said flame tube to said combustion space, fuel injection means comprising an injector body adapted to be mounted adjacent a wall of said flame tube, said injector body being an open-ended tubular body adapted to be supported within the combustion chamber so that part of the air from said duct passes substantially without deviation through the tubular body from one end thereof to the other, there being an inwardly-facing channel in the inner surface of the tubular body to encircle the passage through the body, one end wall of the channel being formed as an inwardly-extending lip defining the downstream open end of the tubular body, tangentially-arranged fuel inlets opening through said inner surface into the channel whereby a swirling layer of fuel can be formed in said channel to spill over said lip to produce a conical sheet spray, and a substantially conical baffle member supported substantially coaxially downstream of the lip to deflect the air flowing through the downstream open end of the tubular body into a conical path thereby to assist in the atomization of the fuel spray.

4. Fuel injection means as claimed in claim 3, wherein the tubular body is provided with means affording a fuel gallery encircling the inwardly-facing channel and communicating therewith through orifices leading tangentially into the base of the channel and forming said fuel inlets, the fuel gallery being connected to be fed with fuel from a fuel supply pipe.

5. Combustion equipment of a gas-turbine engine comprising an air casing including at least one wall adapted to define a duct through which substantially the whole of the air for combustion passes into said combustion equipment, a flame tube having at least one wall adapted to define a combustion space internally of it, said flame tube including air entry means adapted to admit air from externally of said flame tube to said combustion space, and fuel injection means comprising a fuel injector body adapted to be mounted adjacent the inlet end of said flame tube, said injector body comprising a block and a pair of orifice-forming pieces secured to the block one on each side of it, the block being formed with a pair of oppositely-facing surfaces each of which co-operates with one of said orifice-forming pieces and each of which surfaces has an upstream portion and an outwardly-curved downstream portion whereof the downstream edges are sharp, and each orifice-forming piece having a cut-away adjacent the one of the surfaces of the block co-operating with it to form with said surface an open-ended convergent passageway whereof the inlet end opens to said duct and the outlet end opens to said combustion space, and means to deliver fuel to said surfaces of the block adjacent the outlet ends of said passageways to flow in sheet form outwardly over said curved portions of said surfaces and to spill over the sharp edges at the downstream ends of said surfaces.

6. In or for combustion equipment of a gas turbine engine comprising an air casing including at least one wall adapted to define a duct through which substantially the whole of the air for combustion passes into the combustion equipment, a flame tube having at least one wall adapted to define a combustion space internally of said flame tube, said flame tube including air entry means adapted to admit air from externally of said flame tube to said combustion space, fuel injection means comprising an injector body means mounted adjacent a wall of said flame tube, said injector body means defining a passage means therethrough having an inlet end and an outlet end, said passage means opening at its outlet end to said combustion space and at its inlet end to said duct, a baffle member extending through the outlet of said passage means and extending within said passage means, said baffle member having an outwardly-extending portion at its downstream end which portion extends substantially across the axial projection of the passage means downstream of the outlet of said passage means, whereby air flowing into the combustion space through said passage means is diverted outwardly adjacent the outlet of said passage means, means defining a fuel-receiving surface adjacent the outlet of said passage means, part at least of said surface forming a boundary of said passage means, means defining a projecting lip at the downstream end of said surface, and means to supply fuel to said fuel-receiving surface.

References Cited in the file of this patent

UNITED STATES PATENTS

| | | |
|---|---|---|
| 1,451,063 | Anthony | Apr. 10, 1923 |
| 1,462,395 | Thompson | July 17, 1923 |
| 2,532,711 | Goddard | Dec. 5, 1950 |
| 2,551,276 | McMahan | May 1, 1951 |
| 2,595,759 | Buckland et al. | May 6, 1952 |
| 2,602,292 | Buckland et al. | July 8, 1952 |
| 2,617,252 | Klein | Nov. 11, 1952 |

FOREIGN PATENTS

| | | |
|---|---|---|
| 114,069 | Great Britain | Mar. 21, 1918 |